United States Patent
Cuddihy et al.

(10) Patent No.: US 9,510,159 B1
(45) Date of Patent: Nov. 29, 2016

(54) DETERMINING VEHICLE OCCUPANT LOCATION

(71) Applicant: Ford Global Technologies, LLC, Dearborn, MI (US)

(72) Inventors: Mark A. Cuddihy, New Boston, MI (US); Manoharprasad K. Rao, Novi, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/713,019

(22) Filed: May 15, 2015

(51) Int. Cl.
*H04W 24/00* (2009.01)
*H04W 4/04* (2009.01)

(52) U.S. Cl.
CPC .................................. *H04W 4/046* (2013.01)

(58) Field of Classification Search
CPC ............... B60R 21/0132; B60R 2021/23153; B60R 16/037; B60R 21/01542; B60R 21/0153; B60R 21/01552; B60R 21/01554; B60R 22/20; B60R 21/203; B60R 21/21; B60R 11/0241; B60R 2022/4858; B60R 2325/101
USPC ..................................................... 455/456.1
See application file for complete search history.

(56) References Cited

U.S. PATENT DOCUMENTS

| | | |
|---|---|---|
| 6,525,646 B1 | 2/2003 | Bartz |
| 6,982,656 B1 | 1/2006 | Coppinger et al. |
| 7,171,026 B2 | 1/2007 | Shinada |
| 8,036,715 B2 | 10/2011 | Buck |
| 8,378,292 B1 | 2/2013 | Climent et al. |
| 8,738,292 B1 | 5/2014 | Faaborg et al. |
| 8,862,486 B2 | 10/2014 | Cordova |
| 9,037,125 B1 | 5/2015 | Kadous |
| 9,037,199 B1 | 5/2015 | Stogaitis et al. |
| 2003/0098784 A1* | 5/2003 | Van Bosch ......... B60R 25/1004 340/425.5 |
| 2006/0253249 A1 | 11/2006 | Brulle-Drews |
| 2009/0085728 A1 | 4/2009 | Catten et al. |
| 2009/0327888 A1 | 12/2009 | Woolf et al. |
| 2010/0201505 A1 | 8/2010 | Honary |
| 2010/0280711 A1 | 11/2010 | Chen |
| 2011/0074565 A1* | 3/2011 | Cuddihy ................ B60N 2/002 340/457 |
| 2011/0084807 A1 | 4/2011 | Logan et al. |
| 2012/0053793 A1 | 3/2012 | Sala |

(Continued)

FOREIGN PATENT DOCUMENTS

| | | |
|---|---|---|
| KR | 101319939 B1 | 10/2013 |
| KR | 101335344 B1 | 12/2013 |
| WO | WO 2013188977 A2 | 12/2013 |

OTHER PUBLICATIONS

US 8,868,286, 10/2014, Mullen (withdrawn)

(Continued)

*Primary Examiner* — Kwasi Karikari
(74) *Attorney, Agent, or Firm* — Frank MacKenzie; Bejin Bieneman PLC

(57) ABSTRACT

A method includes receiving one or more messages including a first message from a first mobile device. The first mobile device is wearable. Based at least in part on the first message, the first mobile device is associated with a first user. Steering wheel movement data during a first time period and movement data from the first mobile device during the first time period are also received. Based on the steering wheel movement data and the first mobile device movement data, it is determined that the first user occupies a vehicle driver seat.

20 Claims, 4 Drawing Sheets

(56) References Cited

U.S. PATENT DOCUMENTS

| | | |
|---|---|---|
| 2013/0088352 A1 | 4/2013 | Amis |
| 2013/0109342 A1 | 5/2013 | Welch |
| 2013/0150004 A1 | 6/2013 | Rosen |
| 2013/0158771 A1 | 6/2013 | Kaufmann |
| 2014/0164559 A1 | 6/2014 | Demeniuk |
| 2014/0180731 A1 | 6/2014 | Cordova |
| 2014/0188348 A1 | 7/2014 | Gautama et al. |
| 2014/0297220 A1* | 10/2014 | Raffa .............. B60N 2/002 702/150 |
| 2014/0309934 A1 | 10/2014 | Ricci |
| 2014/0310788 A1 | 10/2014 | Ricci |
| 2014/0333425 A1 | 11/2014 | Giraud |
| 2014/0335902 A1 | 11/2014 | Guba |
| 2015/0019266 A1 | 1/2015 | Stempora |
| 2015/0025917 A1 | 1/2015 | Stempora |
| 2015/0070131 A1 | 3/2015 | Beaurepaire et al. |
| 2015/0130640 A1 | 5/2015 | Ryu et al. |
| 2015/0256996 A1 | 9/2015 | Allen et al. |

OTHER PUBLICATIONS

P. Koteswara Rao, "Scening of an accidental alarm system of vehicles with a Heart beat sensor," International Journal of Emerging Trends & Technology in Computer Science, vol. 2, Issue 2, Mar.-Apr. 2013, pp. 191-194.

Goglia, et al. "Hand-transmitted vibration from the steering wheel to drivers of a small four-wheel drive tractor", Applied Erognomics 34 (2005) 45-49; accepted Sep. 16, 2002 (5 pages).

Goglia, et al. "Hand-transmitted vibration from the steering wheel to drivers of a small four-wheel drive tractor", Applied Ergonomics 34 (2005) 45-49; accepted Sep. 16, 2002 (5 pages).

* cited by examiner

DETERMINING VEHICLE OCCUPANT LOCATION

CROSS-REFERENCE TO RELATED APPLICATIONS

This application is related to U.S. patent application Ser. No. 14/712,994, filed May 15, 2015, entitled "DETERMINING VEHICLE OCCUPANT LOCATION," U.S. patent application Ser. No. 14/713,008, filed May 15, 2015, entitled "WEARABLE DATA MANAGEMENT DURING INCIDENT," U.S. patent application Ser. No. 14/713,025, filed May 15, 2015, entitled "HAND-ON STEERING WHEEL DETECTION," and U.S. patent application Ser. No. 14/713,045, filed May 15, 2015, entitled "DETERMINING VEHICLE OCCUPANT LOCATION," all being filed on the same day as this application; the complete contents of each of which are hereby incorporated herein by reference in their entireties.

BACKGROUND

Present systems and methods for determining where a user is located within a vehicle suffer from various deficiencies. For example, visual systems such as facial recognition systems are expensive and typically require dedicated cameras. Systems determining user location based on the location of mobile phones are imprecise and unreliable because a user location and a device location can be different, e.g., the user may place the user's mobile phone on another seat.

DESCRIPTION

Introduction

Figure 1:
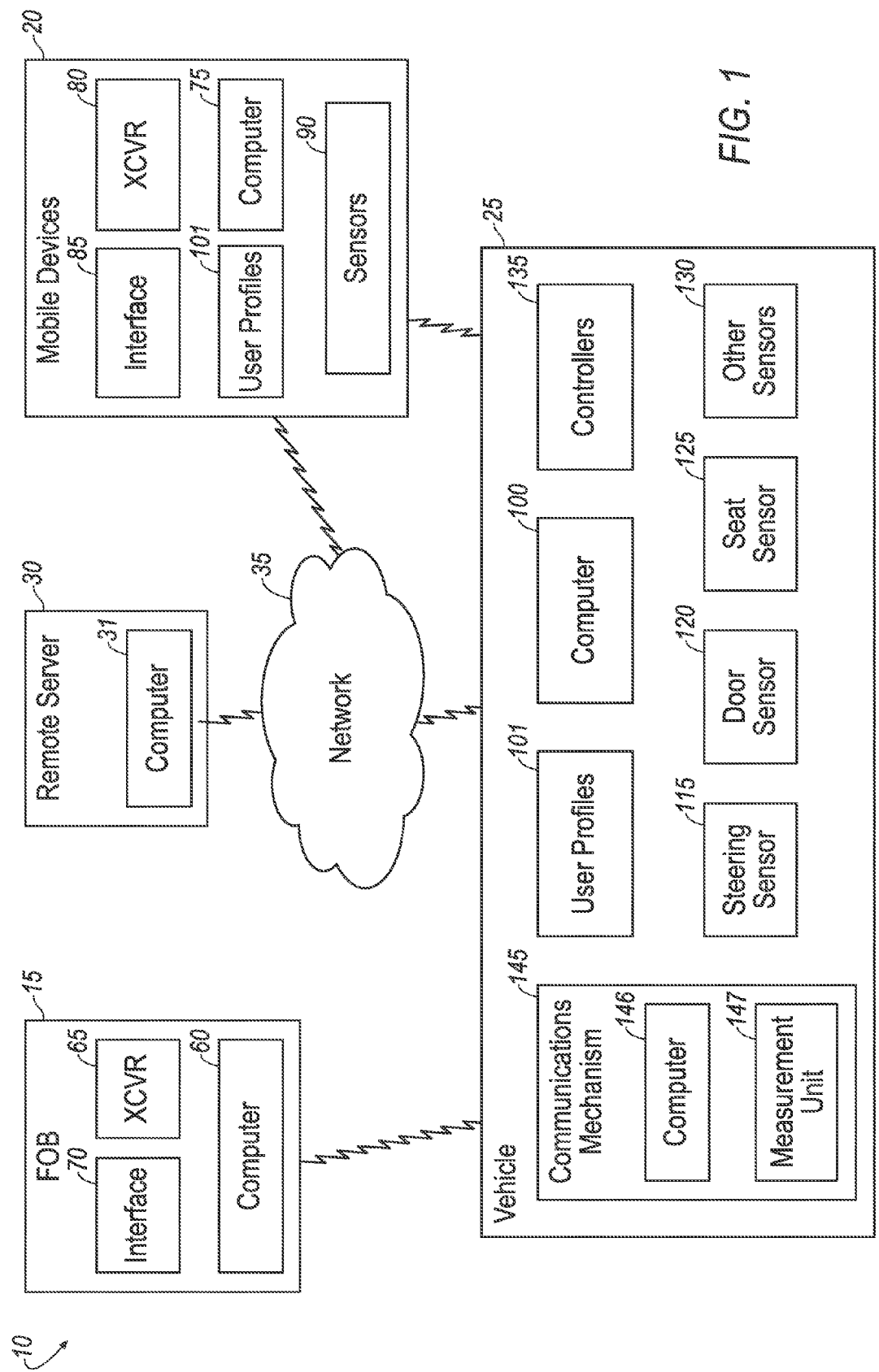
FIG. 1 is block diagram of an exemplary system for determining location(s) of one or more occupants of a vehicle using a wearable device.

Referring to FIG. 1, data indicating one or more movement(s) of one or more mobile devices 20 disclosed herein provides data to a vehicle computer 100 that can be used for determining a location of an occupant of a vehicle 25. The vehicle computer 100 generally receives one or more messages including identification data from one or more mobile devices 20. The vehicle computer 100 may further intercept messages transmitted from a first mobile device 20 to a second mobile device 20. Based on the received and/or intercepted messages received from the mobile devices 20, the vehicle computer 100 executes programming to associate respective mobile devices 20 with users and possibly also with user profiles 101 stored in a memory of the computer 100. The vehicle 25 computer 100 may further determine which, if any, of mobile devices 20 in a set of detected devices 20, are wearable.

The mobile devices 20 typically each include one or more sensors 90, such as 3-axis accelerometers, gyroscopes, compasses, etc., and may collect data representing movement of the mobile device 20 from one or more sensors 90 included therein. The computer 100 may request, and each mobile device 20 may send to the computer 100, such movement data. The computer 100 may receive additional data from vehicle sensors 115, 120, 125, and/or 130, such as steering wheel movement from one or more steering sensors 115, door status information (e.g., opened or closed, time of opening, etc.) from door sensors 120, seat occupancy information from seat sensors 125, etc.

The vehicle 25 computer 100 may in some cases, based on received data from one or more mobile devices 20 and vehicle 25 sensors 115, 120, 125, and/or 130, identify an occupant of a driver seat and/or a passenger seat of a vehicle 25. For example, correlating movement of a mobile device 20 associated with a first user, and movement of a vehicle 25 steering wheel using data from a steering sensor 115, may indicate that the first user is driving the vehicle 25, and therefore in the driver seat. An indication that the a mobile device 20 associated with a second user is in the vehicle 25, along with data indicating that the front row passenger seat is occupied, and that rear doors of the vehicle were not opened, may indicate that the second user is in the passenger seat.

Determining a particular location of, e.g., a specific seat occupied by, a user in a vehicle 25 can allow a vehicle 25 computer 100 to personalize the user experience, by, for example, adjusting climate control, adjusting seat position, adjusting mirror positions, etc. In addition, safety systems such as seatbelt systems and airbag systems may be adjusted according to the respective locations of one or more users within the vehicle 25.

System Elements

Turning to FIG. 1 in more detail, an exemplary occupant locating system 10 includes a remote keyless entry device (hereinafter fob) 15, one or more mobile devices 20, a vehicle 25, a server 30 and a network 35. As described below, the fob 15 and mobile device 20 may be communicatively coupled with the vehicle 25. The vehicle may further be communicatively coupled with the server 30 via the network 35.

The fob 15 is configured, i.e., includes known mechanisms such as programming in a computer 60 and hardware such as a transceiver 65 for wireless communications, to send messages to the vehicle 25, e.g., commands or instructions controlling operations of the vehicle 25. For example, the fob 15 may send commands to the vehicle 25 instructing the vehicle 25 to lock or unlock doors, open a trunk lid or other hatch, start the ignition, etc. The fob 15 further generally includes a user interface 70.

One or more fobs 15 may be paired with a vehicle 25. For example, as is known, a fob 15 may be programmed with a specific identification code and the vehicle 25 may include a list of identification codes authorized to send commands to the vehicle 25. The vehicle 25 may look for one or more identification codes upon receiving messages, and determine if the fob 15 is authorized.

The fob 15 computer 60 includes a processor and a memory. The processor is programmed to execute programs stored in the memory, e.g., to send commands to the vehicle 25. The transceiver 65 is configured to transmit radio frequency (RF) signals to, and optionally receive RF signals from the vehicle 25. As is known, typical fob 15 frequencies of operation for one-way communication are 315 MHz or 433 MH and for two-way communications are 901 MHz or 868 MHz.

The fob 15 user interface 70 includes one or more input mechanisms and may include a display. The input mechanisms may be buttons, a touch screen display, a gesture sensing device, etc., for receiving input from a user. The display may include an LCD display, LED display, buzzers, speakers, haptic feedback, etc., for providing information to the user.

Additionally or alternatively, other systems may also be used to command the vehicle 25 to unlock, start, etc. For example, the vehicle 25 may be equipped with a passive entry system, e.g., that sends a message to fobs 15 proximate the vehicle 25 and looks for a response from a paired fob 15. Other possible systems to unlock/start/etc. the vehicle 25 include a keypad, remote entry mechanical key, telematics unlock system, etc.

A mobile device 20 is generally a known wearable device such as a "smart" watch, a fitness band, etc., and/or a portable mobile device such as a mobile telephone, tablet, laptop, etc. Each mobile device 20 typically includes a computer 75, a transceiver 80, and an interface 85. The mobile device 20 may further include one or more sensors 90, discussed further below.

Each mobile device 20 may be associated with a user. For example, the mobile device 20 may include a user profile 101, and send the user profile 101 to the vehicle 25 when the mobile device 20 initiates communication with the vehicle 25. Alternatively, the mobile device 20 may have been paired with the vehicle 25, for example via a synchronization system in the vehicle 25. In this case, the vehicle 25 may maintain a user profile 101 associated with the paired (synchronized) mobile device 20.

The user profile 101 may be a set of data associated with the user. The user profile 101 may include data such as user preferred vehicle settings (e.g., seat settings, mirror settings, temperature settings, radio station), user characteristics (e.g., height, weight, age, medical conditions), routines (typically drives to work on weekday mornings), etc. The user profile 101 may be maintained by a computer 100 on the vehicle 25. Additionally or alternatively, one or more mobile devices 20 may maintain a user profile 101 identified with the user. The user profiles 101 maintained on the mobile devices 20 may be accessed by the vehicle 25 and combined with the data in the vehicle 25 user profile 101. The data in the user profile 101 may be entered by the user via an interface on the vehicle 25 or one of the mobile devices 20 associated with the user, determined by the computer 100 in the vehicle 25, downloaded from other computing devices, e.g., the server 30, etc.

The mobile device 20 may be configured for short range, wireless communication with the vehicle 25. For example, the mobile device 20 transceiver 80 may be a BLUETOOTH® transceiver capable of forming links with other BLUETOOTH transceivers. One or more mobile devices 20 and the vehicle 25 may accordingly exchange messages. A mobile device 20 may transmit a signal including, e.g., identification data (identifying the type of user device, the identity of a user, etc.), movement data, etc. to the vehicle 25. In addition or alternatively to BLUETOOTH, other suitable wireless communication protocols, e.g., IEEE 802.11 or other protocols as may be known, may be used for communication between the mobile devices 20 and the vehicle 25.

Further, a mobile device 20 may be configured to link with other mobile devices 20. For example, a first mobile device 20 may be a smart watch, and a second mobile device 20 may be a mobile telephone. The first mobile device 20 may link with the second mobile device 20 and exchange data with the second mobile device 20; the first and second mobile devices 20 may be associated with a same user. As one example, the first mobile device 20 may include biometric sensors 90 to measure the heart rate of the user and transmit the heart rate to the second mobile device 20. The second mobile device 20 may output the heart rate data to the user, to the vehicle 25 computer 100, remote server 30, and network 35 via the second mobile device 20 interface 85. BLUETOOTH communication links typically operate at frequencies from 2402-2480 MHz. As above, other suitable wireless communication protocols such as are known may alternatively or additionally be used to form the communication links with other mobile devices 20.

In addition to biometric sensors 90, mobile device 20 sensors 90 may include accelerometers, gyroscopes, compasses, etc. The sensors 90 may measure movements of the mobile device 20 and output movement data that the mobile device 20 may then communicate to the vehicle 25. As described below, the vehicle 25 may determine, based on the movement data, e.g., that the user of the mobile device 20 has opened a door of the vehicle 25 or is operating a steering wheel of the vehicle 25.

Figure 2:
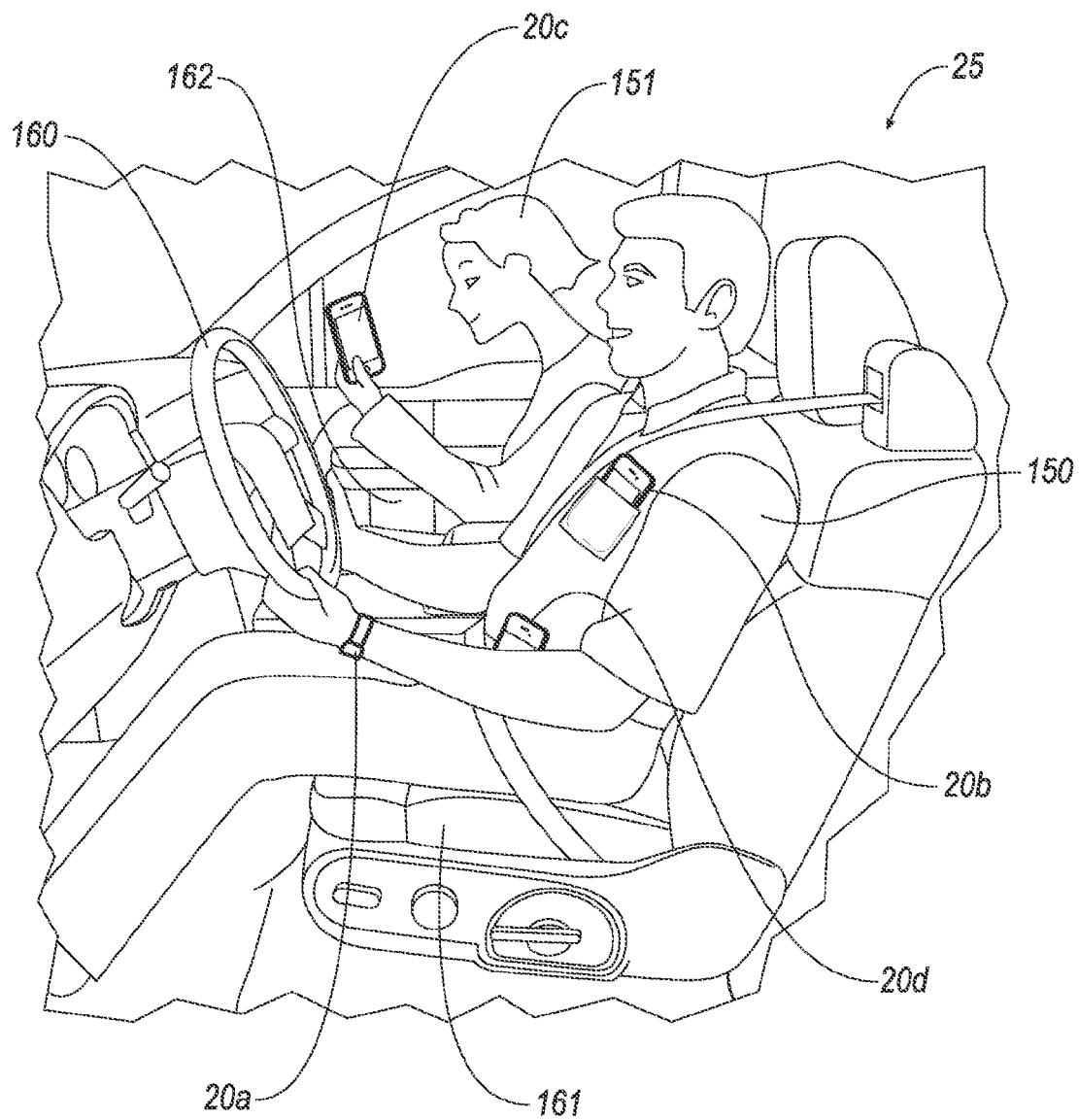
FIG. 2 is a perspective view of a front seating row of an exemplary vehicle occupied by a driver and passenger with mobile devices.

The vehicle 25 is generally a land-based vehicle having three or more wheels, e.g., a passenger car, light truck, etc. The vehicle 25 accordingly generally has a front, a rear, a left side and a right side, wherein the terms front, rear, left and right are understood from the perspective of a user of the vehicle 25 seated in a driver seat in a standard operating position, i.e., facing a steering wheel 160 (FIG. 2). The vehicle 25 includes the computer 100 including a processor and a memory. The memory includes one or more forms of computer-readable media, and storing instructions executable by the processor for performing various operations, including as disclosed herein. Further, the computer 100 may include and/or be communicatively coupled to more than one other computer and sensors, e.g., steering sensors 115, door sensors 120, seat sensors 125, other sensors 130 and controllers 135. The vehicle 25 computer 100 is further typically communicatively coupled with a communications mechanism 145 configured for wireless communications with on-board and external wireless devices including the fob 15, mobile devices 20, remote server 30 and network 35.

The computer 100 is generally programmed and arranged for communications on a controller area network (CAN) bus or the like. The computing device 100 may also have a connection to an onboard diagnostics connector (OBD-II), e.g., according to the J1962 standard. Via the CAN bus, OBD-II connector port, and/or other wired or wireless mechanisms, the computer 100 may transmit messages to various devices in a vehicle and/or receive messages from the various devices, e.g., controllers, actuators, sensors, etc. In addition, the computer 100 may be configured for communicating, e.g., with one or more remote servers 30, with one or more fobs 15, with one or more mobile devices 20 and/or with the network 35.

The steering sensors 115 may be steering angle sensors, steering torque sensors, motor sensors associated with power steering assist, etc., known to provide data related directly or indirectly to steering operations. For example, a steering sensor 115 may be a steering angle sensor which senses a rotation of a vehicle 25 steering wheel 160, and communicates the steering wheel 160 rotation data to the computing device 100. As another example, a steering sensor 115 may sense rotation of a motor providing power assist for steering operations, and provide the motor rotation data to the computer 100.

Door sensors 120 may be mechanical switches that are activated by the door, proximity sensors, or the like, such as are known, that indicate if a door is opened or closed and that provide door status data to the computing device 100. For example, there may be one door sensor 120 associated with each door of the vehicle 25.

Seat sensors 125 may include a variety of sensors including occupancy sensors and seat position sensors such as are known. The seat sensors 125 may, e.g., determine whether a user is occupying a seat, determine the weight of the user, and communicate the determined weight to the computer 100. Further, the seat sensors 125 may detect either directly or indirectly the position of a seat, angle of a seat back, height of a headrest, etc., and provide data to the computer 100 with regard to one or more of these settings. Yet further, the computer 100, may, e.g., upon identifying a seat user, adjust settings to a user profile 101 associated with the user.

The vehicle 25 may include one or more other sensors 130. The other sensors 130, may include, as non-limiting examples only, cameras, optical sensors, radar, microphones, proximity sensors, ultrasonic sensors, pressure sensors, accelerometers, gyroscopes, temperature sensors, current sensors, voltage sensors, infrared sensors, capacitive sensors, etc. The sensors may include processors and memories, and may be configured to communicate with and send data to the computer 100, e.g., via a CAN bus or the like.

The vehicle 25 may also include one or more controllers 135 for controlling vehicle 25 components. The one or more controllers 135 may include known controllers, as non-limiting examples, a seat controller, a power steering controller, a door lock controller, a climate controller, a mirror adjustment controller, a seatbelt controller, a brake controller, etc. Each of the controllers 135 may include respective processors and memories, one or more actuators, and one or more sensors, as is known. The controllers 135 may be configured to receive instructions, e.g., an instruction to adjust a parameter governing the controller 135, from the computing device 100 and control an actuator based on such instructions. For example, a door lock controller 135 may receive an instruction to unlock a door and may cause an actuator to unlock a lock associated with the door. Further, the controller 135 may include sensors. The sensors, may, e.g., detect the action of the actuator. For example, the door lock controller 135 may detect the lock being in an unlocked condition. The controller 135 may provide data regarding the status of the lock to the computer 100.

As stated above, a vehicle 25 may further include a communications mechanism 145 for wireless communications with vehicle on-board and external devices configured for wireless communications. For example, the communications mechanism 145 may include a computer 146 having a processor and a memory, and a measurement unit 147. The communications may be direct communications, i.e., between a transceiver in the communications mechanism 145 and a transceiver in the wireless device, or indirect communications, e.g., via a network such as a network 35.

The communications block 145 may generally be configured to support communications with 1-Way (typically 315 MHz or 433 MHz), or 2-Way (typically 901 MHz to 868 MHz) remote keyless entry (RKE) systems, passive-entry passive-start (PEPS) systems (125 kHz LF challenge and 315 MHz or 433 MHz response), near field communications (NFC) (typically 125 kHz), Bluetooth systems (2402-2408 MHz), vehicle-to-vehicle (V2V) systems and vehicle-to-infrastructure (V2I) systems in the Dedicated Short Range Communications (DSRC) Band (5.9 GHz), mobile devices in the cellular bands, Wi-Fi (typically 2.4 GHz or 5 GHz), GPS systems (1575.42 MHz and 1227.6 MHz), etc. Examples of protocols that the communication block 145 may support include Bluetooth, NFC, DSRC, 3G UMTS protocols as defined by the 3GPP standards body, 4G LTE protocols as defined by the 3GPP standards body, Wi-Fi 802.11 protocols as defined by IEEE, W-Max 802.16 protocols as defined by IEEE, or other suitable wireless communication protocols.

As described in more detail below, the communications mechanism 145 may be configured to communicate with the fob 15, the mobile device 20 and, via the network 35, with a remote server 30.

The communications mechanism 145 may be configured to establish communications with one or more mobile devices 20. Upon receiving an instruction to unlock the vehicle 25 as described above, the computer 100 may instruct the communications mechanism 145 to search for and establish communications with mobile devices 20 proximate to, e.g., within 3 meters of or within the communication range of the communications mechanism 145 of the vehicle 25. The communications mechanism 145 may search for all mobile devices 20 proximate to the vehicle 25, or, e.g., a specific list of mobile devices 20 associated with known users of the vehicle 25. The mobile devices 20 may then respond to the communications mechanism 145. In another scenario, the communications mechanism 145 may, e.g., periodically search for, and establish communications with, mobile devices 20 proximate the vehicle 25. Upon establishing communications with the devices 20, the communications block 145 may send instructions requesting user identification data, movement data, etc. from the mobile devices 20.

In addition to communicating with mobile devices 20, the communications mechanism 145 may determine a strength of signals received from respective mobile devices 20. As shown in FIG. 1, the communications mechanism 145 may include a measurement unit 147. The measurement unit 147 may receive signals from the mobile devices 20, and measure signal strength in a known manner. The measurement unit 147 may provide this information to the computer 100. As described below, the strength of a signal received from a mobile device 20 may be an indication of the distance (also referred to herein as range) of the mobile device 20 from the communications mechanism 145. This information may be used to determine where a user of the mobile device 20, e.g., a wearable mobile device 20, is located within the vehicle 25.

The vehicle 25 communications mechanism 145 may further be configured to communicate, e.g., over a network 35 with a remote server 30. For example, when the vehicle 25 has been involved in an accident, the vehicle 25 may be able to transmit a message to the remote server 30 indicating that the vehicle 25 was involved in an accident, and may be able to send additional information such as the location of the vehicle 25. When the vehicle 25 is linked to one or more mobile devices 20, the vehicle 25, via the communications mechanism 145 may additionally or alternatively be able to send user status information, such as the user's vital signs, to the remote server 30.

The network 35 represents one or more mechanisms by which the vehicle 25 may communicate with remote computing devices, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Processes

Identifying a Vehicle Unlock or Other Trigger Event for a User Location Identification Process The vehicle 25 computer 100 may receive a signal from the fob 15 to unlock the vehicle 25, or recognize another trigger event for starting a user location identification process. For example, a user of the vehicle 25 may activate the fob 15, and the fob 15 may send an unlock command to the vehicle 25. The vehicle 25 computer 100 may receive the unlock signal, and initiate a process to identify locations of one or more users in the vehicle 25.

As another example, a sensor 130 may detect a user opening a door handle, and based on the detection, the computer 100 may initiate and establish communications with fobs 15 proximate the vehicle 25. The computer 100 may determine that one or more of the fobs 15 is an authorized fob 15 for the vehicle 25, e.g., in a manner as described above. The computer 100 may also receive an input from a key pad on the vehicle 25, an ignition activated by a mechanical key, from a telematics system, etc. that is identified as a trigger event for initiating a user location identification process. Still further, the computer 100 could initiate the user location identification process periodically, based on a timer, etc.

Grouping Mobile Devices and Associating Mobile Devices with Users

The computer 100 is generally programmed to initiate a process to communicate with one or more mobile devices 20 proximate to the vehicle 25. For example, the computer 100 may be triggered to initiate communications as described above. The computer 100 may send commands to mobile devices 20 that were previously paired with the vehicle 25 requesting that the mobile devices 20 respond and provide identification. The computer 100 may further listen for other, not previously paired mobile devices 20 that are proximate to the vehicle 25. Further, the computer 100 may listen for messages between mobile devices 20. Based on data collected from the messages, e.g., each mobile device 20 may transmit an identifier or the like, the computer 100 may identify a mobile device 20 or a group of mobile devices 20 associated with a user, and may further associate the user and group of mobile devices 20 with a user profile 101, e.g., maintained by the computer 100. The computer 100 then can wait for a predetermined time period, e.g., 10 seconds, following the transmission of the commands to the mobile devices 20, and proceed to identify one or more groups of mobile devices 20, and to associate the mobile devices 20 and/or groups of mobile devices 20 with users.

Now referring to FIG. 2, the vehicle 25 includes a steering wheel 160, a driver seat 161, and a passenger seat 162. As an illustrative example, a first user 150 may be located in the driver seat 161, and a second user 151 may be located in the passenger seat 162. The first user 150 may be wearing a first mobile device 20a, and may further be carrying a second mobile device 20b. The second user 151 may be carrying a third mobile device 20c. The first user may also be carrying a fourth mobile device 20d, such as a personal cellular phone in addition to a work cellular phone.

The vehicle 25 computer 100 may initiate communications with each of the mobile devices 20a, 20b, 20c and 20d. The mobile devices 20a, 20b, 20c and 20d may have been previously paired with the vehicle 25. For example, the mobile devices 20a, 20b, 20c, 20d and the communications mechanism 145 may each be equipped with Bluetooth transceivers. The Bluetooth transceivers of the mobile devices 20a, 20b, 20c and 20d may have been individually synchronized, as is known, with the Bluetooth transceiver in the communications mechanism 145 (FIG. 1). The computer 100 may have previously obtained identification codes identifying the mobile devices 20a, 20b, 20c and 20d and stored the identification codes in its memory.

Further, the computer 100 may receive communications between remote devices 20. For example, mobile device 20a, used by the first user 150, may be a "smart watch" including biometric sensors 90 (FIG. 1). Mobile device 20b, also used by the first user 150 may be a mobile phone. The mobile device 20a may transmit, e.g., data from the biometric sensors 90 to the mobile device 20b. The mobile device 20b may then display the data, for example on the mobile device 20b interface 85.

The computer 100 may receive communications from the mobile devices 20a and 20b and also the communications between mobile device 20a and mobile device 20b and, based on these communications, determine that the mobile devices 20a, 20b are a group of mobile devices 20 operated by one user.

For example, the computer 100 may receive the identification codes from devices 20a, 20b and 20d, and based on its internally stored user profile 101, determine that these two devices are being operated by one user.

Grouping the mobile devices 20a, 20b and 20d in this manner may be useful to associate a particular wearable mobile device 20a with a particular user profile 101. For example, in the example above, the mobile device 20b may be a mobile telephone associated with a user profile 101 maintained by the computer 100. The wearable device 20a, may not have been previously linked with the user profile 101. The computer 100 may, based on the determination that the mobile devices 20a, 20b and 20d are a group associated with a single user, further identify the wearable mobile device 20a as being used by the first user 150. In this manner, e.g., movement data received from the mobile device 20a may also be associated with the first user 150.

Grouping mobile devices 20b and 20d in this manner may be useful to determine that additional mobile devices 20 detected by the vehicle 25 are not indicative of an additional occupant, but are being shared by a single user. For example, in the example above, the computer 100 can determine which of the mobile devices are associated with the first user 150 and which are associated with the second user, 151. In another scenario where mobile device 20c was not present, this logic would prevent the vehicle from incorrectly associating the second mobile device 20d with the second user (151).

Determining User Location in Vehicle Based on Mobile and Vehicle Data

The vehicle 25 computer 100 may utilize data received from mobile devices 20, combined with data received from vehicle sensors 115, 120, 125, 130, and/or controllers 135, to determine the location of users in the vehicle 25. Now referring to FIG. 3, the vehicle 25 may include a steering wheel 160, driver seat 161, front passenger seat 162, front left door 165, front right door 170, rear left door 175, and rear right door 180. The steering wheel 160 may be associated with steering sensor 115, the front passenger seat 162 associated with seat sensor 125, and the doors 165, 170, 175, 180 associated respectively with door sensors 120a, 120b, 120c, 120d. The vehicle 25 may further include the communications mechanism 145. The communications mechanism 145 may be located in a front center portion of the vehicle 25.

Following the example scenario described above, the computer 100 may have established communications with mobile devices 20a, 20b, 20c and 20d. The computer 100 may further have associated mobile devices 20a, 20b and 20d with the first user 150 and the mobile device 20c with the second user 151. In this manner, the computer 100 may determine that the first user 150 and second user 151 are proximate to the vehicle 25. The computer 100 may further have determined that mobile device 20a is wearable, and instructed the mobile device 20a to send movement data to the computer 100.

Establishing Correlation Between Wearable Movement Data and Steering Wheel Movement Data Based on a correlation between movement data from a wearable mobile device 20 and steering wheel 160 movement data from the steering sensor 115, the computer 100 may determine the driver of the vehicle 25.

For example, again following the scenario discussed above, the computer 100 may receive movement data from one or more steering sensors 115 indicating that the steering wheel 160 is turning, as well as data concerning attributes of the steering wheel 160 motion, e.g., rate of rotation, torque being applied, number of hands on the steering wheel 160, pressure applied to the steering wheel 160 by one or both hands, etc. The computer 100 may further receive movement data from the wearable mobile device 20a indicating movement in a corresponding time period. The computer 100 may correlate the wearable device 20a movement to the steering wheel 160 movement.

For example, in the case where a driver is making a turn and using two hands, the computer 100 may determine that the wearable mobile device 20a is moving in a circular fashion. The computer 100 may correlate the movements of the wearable mobile device 20a with the steering wheel 160 and assign a correlation value. The computer 100 may also take into consideration, e.g., a timing of the movements in determining the correlation value. If the correlation value exceeds a predetermined threshold, the computer 100 may determine that the first user 150, associated with the wearable mobile device 20a, is driving the vehicle 25, and therefore located in the driver seat 161. The computer 100 may also use the correlations studied over a period of time to confirm that the first user 150 associated with the wearable device 150 is located in the driver seat.

Identifying an Occupant of the Passenger Seat

The computer 100 may further use mobile and vehicle data to determine the occupant of the passenger seat 162. Still following the example above, the computer 100 may receive data from the seat sensor 125 indicating that the passenger seat 162 is occupied.

The computer 100 may further receive data from door sensors 102a, 120b, 120c and 120d associated respectively with vehicle 25 doors 165, 170, 175 and 180. Based on the data received from the door sensors 120c, 120d, the computer 100 may determine that the rear doors 175, 180 were not opened in a predetermined time period, e.g., since the computer 100 started the user location identification process due to the vehicle user operating a remote control device or by touching vehicle doors, etc. Based on the determinations that 1) the first user is driving, 2) the passenger seat is occupied, and 3) the rear doors 175, 180 have not been opened since the user location identification process started, the computer 100 may determine that the second user 151 is in the passenger seat.

The computer 100 may use additional data to identify the location of users in the vehicle 25. For example, the computer 100 may receive information that the vehicle is moving from the other sensors 130, and monitor the presence of the mobile devices 20a, 20b, 20c, 20d to confirm that the users are in the vehicle 25. The computer may monitor the front door sensors 120a, 120b to determine that both front doors 165, 170 were opened since the beginning of the user location identification process, etc.

Identifying Location Zones for Wearable Devices Based on Received Signal Strength A strength of a signal received from a mobile device 20 may be used as an indication of where the mobile device 20 is located.

Figure 3:
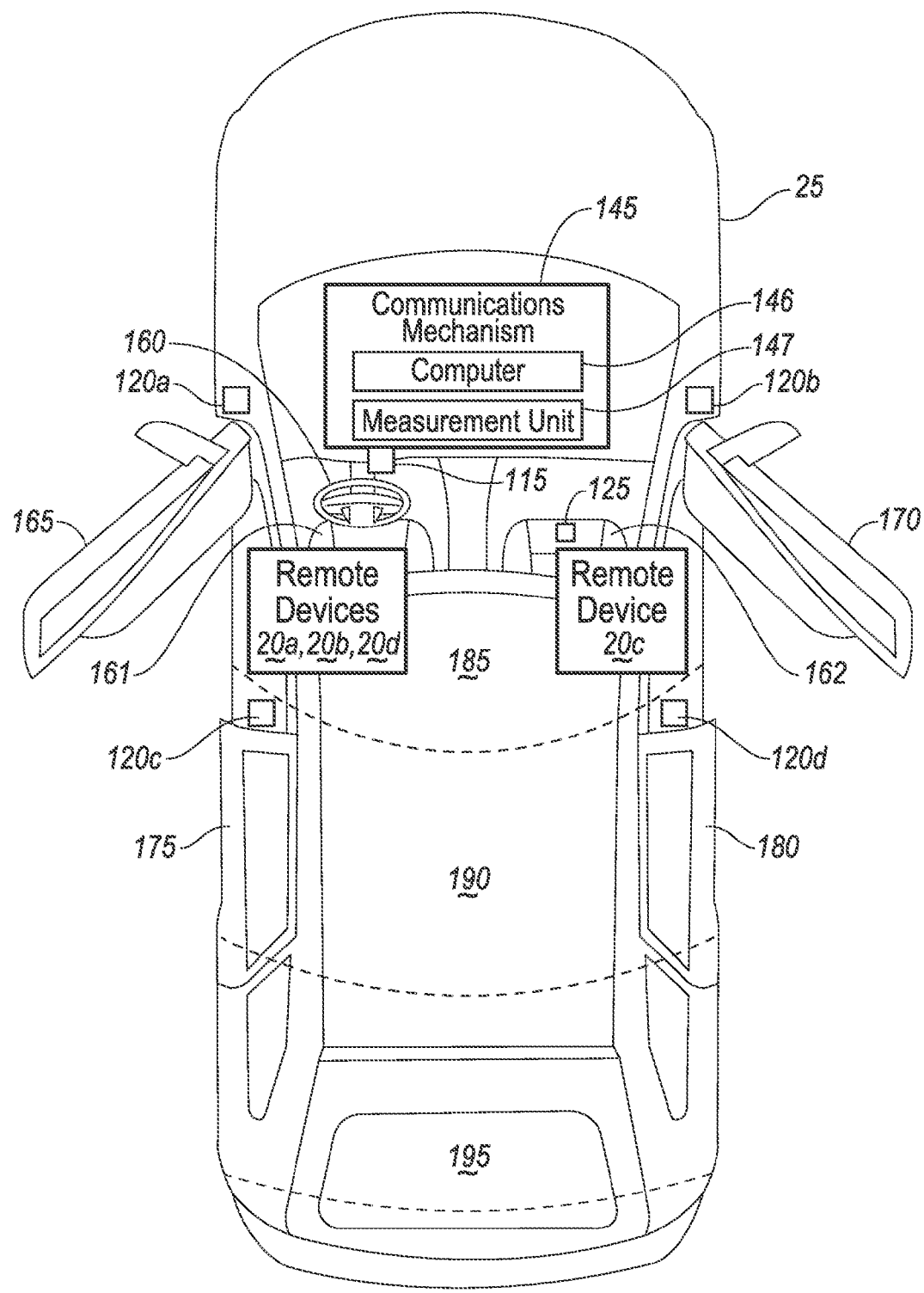
FIG. 3 is a top view of an exemplary vehicle including a steering wheel and front row seats illustrating an exemplary location of mobile devices.

As discussed above, the vehicle 25 may include a communications mechanism 145. Referring to FIG. 3, the communications mechanism 145 may be located in a front center of the vehicle 25. Alternatively, a portion of the communication mechanism 145 used to establish communication with the mobile devices 20 may be located in the front center portion of the vehicle 25, and other portions of the communications mechanism 145 may be located in one or more other locations in the vehicle 25. The portion of the communications mechanism 145 used to establish communications with the mobile devices 20 should be placed such that the strength of a signal received from a respective mobile device 20 is indicative of a defined zone within the vehicle 25.

The communications mechanism 145 may include a signal strength measurement unit 147, and may be configured to establish communications with mobile devices 20. The measurement unit 147 may be configured to measure strength of signals received from the mobile devices 20, e.g., in a known manner, and to report the strength of the signals from the respective mobile devices 20 to the computer 100 of the vehicle 25. The computer 100 may determine, based on the received signal strengths, respective locations of the one or more mobile devices 20 in the vehicle 25.

For example, as shown in FIG. 3, the vehicle 25 may be divided into three zones based on distances from the communications mechanism 145; a first zone 185, a second zone 190 and a third zone 195. The zones 185, 190, 195 may, e.g., be radially shaped around a receiver portion, e.g., an antenna, in the communications mechanism 145. As another example, the receiver portion in the communications mechanism 145 may be directional, i.e., have a reception sensitivity that is greater in some directions than others, and the zones 185, 190, 195 may be defined by the directionality of the receiver portion. The mobile devices 20a, 20b, 20c and 20d may be located in the first zone 185. The computer 100, following the example above, may establish communications with each of the mobile devices 20a, 20b, 20c and 20d.

The communications mechanism 145 may be configured to measure respective received signal strengths of the signals received from each of the mobile devices 20a-20d, and provide a received signal strength indication (RSSI) such as is known to the computer 100 respectively for each of the mobile devices 20a-20d.

Based on the respective received signal strengths, the computer 100 may determine the zone in which each of the mobile devices 20a-20d is located. For example, if the RSSI is greater than or equal to a first predetermined threshold and less than a second predetermined threshold, the computing device may determine that the associated mobile device 20 is located within the third zone 195. If the RSSI is greater than or equal to the second predetermined threshold and less than a third predetermined threshold, the computer 100 may determine that associated mobile device 20 is located in the second zone 190. If the RSSI is greater than or equal to the third predetermined threshold, the computer 100 may determine that the associated mobile device 20 is located in the first zone 185. The first, second and third predetermined thresholds may be determined empirically based on representative mobile devices 20, the location of the communications mechanism 145, the type of vehicle 25, etc. In the example according to FIG. 3, the computer 100 would determine that mobile device 20a-20d are in the first zone 185.

Process for Determining User Location(s)

Figure 4:
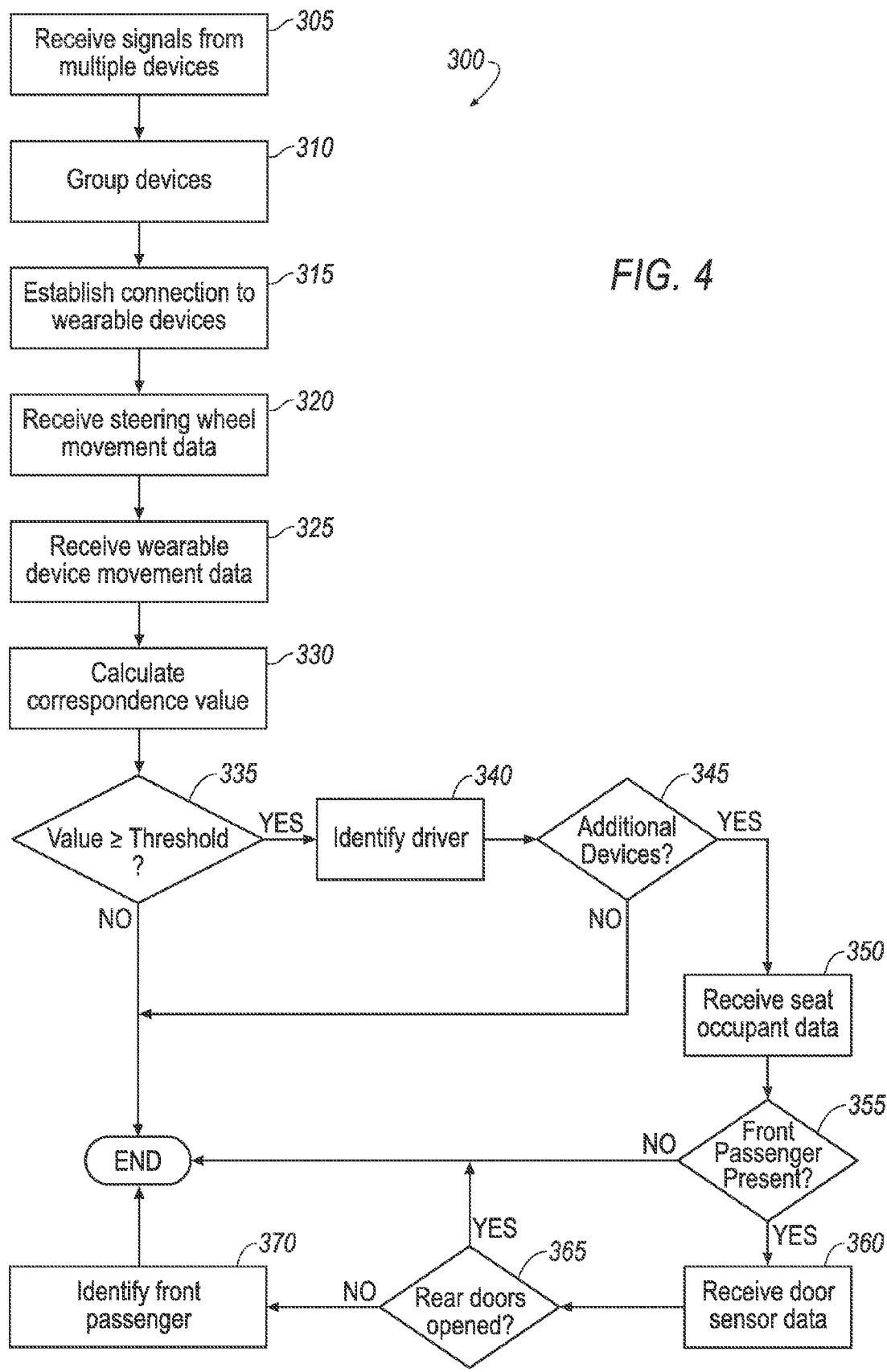
FIG. 4 is a diagram of an exemplary process for determining location(s) of one or more occupants in a front seating row of a vehicle.

FIG. 4 is a diagram of an exemplary process 300 for determining respective location(s) of one or more users within the vehicle 25 based on data from mobile devices 20 associated with vehicle 25 users. The process 300 starts in a block 305.

In the block 305, the vehicle 25 computer 100 receives signals from one or more mobile devices 20. For example, the computer 100 may periodically listen for mobile devices 20 proximate the vehicle. Alternatively, the computer 100 may periodically search for previously paired mobile devices 20 by sending messages requesting a response. Additionally or alternatively, as described above, the computer 100 may recognize a trigger event, such as an instruction from a fob 15 to unlock the vehicle 100, and initiate a search for mobile devices 20. The computer 100 may establish communications with the mobile devices 20 proximate to the vehicle 20. The computer 100 may further determine which mobile devices 20 are wearable. The process 300 continues in the block 310.

In the block 310, the computer 100 may identify and group together mobile devices 20 as described above and associate the mobile devices 20 with users. The computer 100 may further associate the mobile devices 20 with user profiles 101. For example, based on communications received from the mobile devices 20, and the user profiles 101, the computer 100 may determine that mobile devices 20b, 20d and the wearable mobile device 20a are associated with a first user and that a mobile device 20c is associated with a second user. The process 300 continues in a block 315.

In the block 315, the computer 100 may send a message to the wearable mobile devices 20a and/or other mobile devices 20b, 20c and 20d requesting the mobile devices 20 to measure and send data representing movement of the mobile devices 20. The process continues in a block 320.

In the block 320, the computer 100 receives data from the steering wheel sensor 115. The computer 100 may monitor the data from the steering wheel sensor 115, and identify, e.g., a turning event. The computer 100 may further, e.g., store the movement data. The process 300 continues in a block 325.

In the block 325, the computer 100 may receive movement data related to the wearable mobile device 20a from mobile devices 20. The process 300 continues in a block 330.

In the block 330, the computer 100 correlates, as described above, the wearable mobile device 20a movement data with the steering wheel 160 movement data and determines a correlation value. The process 300 continues in a block 335.

In the block 335, the computer 100 determines if the correlation value is greater than or equal to a predetermined threshold value. If the correlation value is less than the predetermined threshold value, the process 300 ends. If the threshold value is greater or equal to the predetermined threshold value, the process 300 continues a block 340.

In the block 340, the computer 100 determines, based on the correlation between the movement of the wearable device 20a and the movement of the steering wheel 160 that the first user is driving the vehicle 25 and therefore in the driver seat 161. The process 300 continues in a block 345.

In the block 345, the computer 100 determines if additional mobile devices 20, not associated with the first user, are present. If no additional mobile devices are present, the process 300 ends. If additional mobile devices 20, e.g., the mobile device 20c, are present, the process 300 continues in a block 350.

In the block 350, the computer 100 receives data from the seat sensor 125 associated with the passenger seat 162. The process 300 continues in a block 355.

In the block 355, the computer 100 determines, based on the data from the seat sensor 125, if the front passenger seat 162 is occupied. If the front passenger seat 162 is not occupied, to process 300 ends. If the front passenger seat 162 is occupied, the process continues in a block 360.

In the block 360, the computer 100 receives data from the rear door sensors 120c, 120d. The process 300 continues in a block 365.

In the block 365, the computer 100 determines, based on the data from the rear door sensors 120c, 120d if the rear doors 175, 180 were opened, e.g., since the user location identification process started in the block 305. If one or both of the rear doors 175, 180 were opened, the process 300 ends. If neither of the rear doors 175, 180 were opened since the user location identification process started, the process 300 continues in a block 370.

In the block 370, the computer 100 determines the occupant of the vehicle 25 front passenger seat 162. For example, based on the presence of the mobile device 20c, the determination that the front passenger seat 162 is occupied, and that no rear door 175, 180 has been opened as described above, the computer 100 may determine that the second user occupies the front passenger seat 162. The process 300 then ends.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A method comprising:
   receiving, one or more messages including a first message from a first mobile device, the first mobile device being a wearable device;
   determining, based at least in part on the first message, that the first mobile device is associated with a first user;
   receiving steering wheel movement data during a first time period;
   receiving, from the first mobile device, data representing movement of the first mobile device during the first time period;
   determining that a correlation value between the steering wheel movement data and the first mobile device movement data during the first time period is greater than a predetermined threshold; and
   further determining, based on the determination that the correlation value is greater than the predetermined threshold, that the first user occupies a vehicle driver seat.

2. The method of claim 1, further comprising:
   sending instructions to at least one vehicle controller to adjust at least one parameter governing a vehicle component based at least in part on determining that the first user occupies the vehicle driver seat.

3. The method of claim 1, wherein the one or more messages includes a second message from a second mobile device, further comprising:
   determining, based at least in part on the first and second messages, that each of the first and second mobile devices is associated with the first user.

4. The method of claim 3, further comprising:
   receiving communications from and between the first mobile device and the second mobile device;
   wherein determining that the first and second mobile devices are associated with the first user is based in part on the communications from and between the first mobile device and the second mobile device.

5. The method of claim 3, wherein the one or more messages includes a third message from a third mobile device, further comprising:
   determining that the third mobile device is associated with a second user.

6. The method of claim 5, further comprising:
   receiving a seat status signal indicating that a front passenger seat is occupied;
   monitoring door signals from door sensors;
   determining, based at least in part on the door signals, that no rear vehicle doors were opened during a second time period; and
   determining, based at least in part on the third message, and the seat status signal and the door signals during the second time period that the second user occupies the front passenger seat.

7. The method of claim 5, further comprising:
   sending instructions to at least one vehicle controller to adjust at least one parameter governing a vehicle component based at least in part on the determination that the second user occupies the vehicle front passenger seat.

8. The method of claim 1, further comprising:
   identifying a trigger event to initiate communications; and
   sending a request to one or more mobile devices to respond and provide identification.

9. The method of claim 1, further comprising:
   associating the first user with a first user profile; wherein the determination that the first mobile device is associated with the first user is based at least in part on the first user profile.

10. The method of claim 1, wherein the one or more messages are received within a predetermined time period.

11. A computer, comprising:
    a memory
    a processor, the memory storing instructions such that the processor is programmed to:
      receive one or more messages including a first message from a first mobile device, the first mobile device being wearable;
      determine, based at least in part on the first message, that the first mobile device is associated with a first user;
      receive steering wheel movement data during a first time period;
      receive from the first mobile device data representing movement of the first mobile device during the first time period;
      determine that a correlation value between the steering wheel movement data and the first mobile device movement data during the first time period is greater than a predetermined threshold; and
      further determine, based on the determination that the correlation value is greater than the predetermined threshold, that the first user occupies a vehicle driver seat.

12. The computer of claim 11, wherein the processor is further programmed to:
send instructions to at least one vehicle controller to adjust at least one parameter governing a vehicle component based at least in part on determining that the first user occupies the vehicle driver seat.

13. The computer of claim 11, wherein the one or more messages includes a second message from a second mobile device, and the processor is further programmed to:
determine, based at least in part on the first and second messages, that each of the first and second mobile devices is associated with the first user.

14. The computer of claim 13, wherein the processor is further programmed to:
receive communications from and between the first mobile device and the second mobile device; wherein determining that the first and second mobile devices are associated with the first user is based in part on the communications from and between the first mobile device and the second mobile device.

15. The computer of claim 13, wherein:
the one or more messages includes a third message from a third mobile device; and
the processor is further programmed to determine that the third mobile device is associated with a second user.

16. The computer of claim 15, wherein the processor is further programmed to:
receive a seat status signal indicating that a front passenger seat is occupied;
monitor door signals from door sensors;
determine, based on the door signals, that no rear vehicle doors were opened during a second time period; and
determine, based at least in part on the third message, the seat status signal and the door signals during the second time period that the second user occupies the front passenger seat.

17. The computer of claim 16, wherein the processor is further programmed to:
send instructions to at least one vehicle controller to adjust at least one parameter governing a vehicle component based at least in part on the determination that the second user occupies the vehicle front passenger seat.

18. The computer of claim 11, wherein the processor is further programmed to:
identify a trigger event to initiate communications; and
send a request to one or more devices to respond and provide identification.

19. The computer of claim 11, wherein:
the vehicle includes a first user profile, and
the determination that the first mobile device is associated with the first user is based at least in part on the first user profile.

20. The computer of claim 11, wherein the one or more messages is received within a predetermined time period.

* * * * *